United States Patent
Raines et al.

(10) Patent No.: US 10,076,958 B1
(45) Date of Patent: Sep. 18, 2018

(54) COLLAPSIBLE PANEL DUCT FOR A VEHICLE HVAC SYSTEM

(71) Applicant: Ford Global Technologies, LLC, Dearborn, MI (US)

(72) Inventors: Stacey H. Raines, Ypsilanti, MI (US); Robert A. Chanko, South Lyon, MI (US); Shannon Carloni, Dearborn Heights, MI (US); Suresh S. Lanka, Sylvania, OH (US); Jose A. Nava, Plymouth, MI (US)

(73) Assignee: Ford Global Technologies, LLC, Benton Harbor, MI (US)

( * ) Notice: Subject to any disclaimer, the term of this patent is extended or adjusted under 35 U.S.C. 154(b) by 0 days.

(21) Appl. No.: 15/635,404

(22) Filed: Jun. 28, 2017

(51) Int. Cl.
*B60K 37/04* (2006.01)
*B60H 1/00* (2006.01)
*B60H 1/24* (2006.01)

(52) U.S. Cl.
CPC ......... *B60K 37/04* (2013.01); *B60H 1/00564* (2013.01); *B60H 1/242* (2013.01); *B60K 2350/401* (2013.01); *B60K 2350/405* (2013.01); *B60K 2350/941* (2013.01)

(58) Field of Classification Search
CPC ........ B60K 37/00; B60K 37/02; B60K 37/04; B60H 1/00564; B60H 1/0057; B60H 1/00557
USPC .............................................. 296/70; 180/90
See application file for complete search history.

(56) References Cited

U.S. PATENT DOCUMENTS

| 5,622,402 A | 4/1997 | Pritchard et al. |
| 6,783,173 B2 | 8/2004 | Nakamura et al. |
| 8,651,533 B2 | 2/2014 | Shahidehpour et al. |
| 8,702,144 B2 * | 4/2014 | Kamioka ............... B60K 37/04 296/37.12 |
| 2004/0092224 A1 | 5/2004 | Gehring et al. |
| 2007/0295453 A1 | 12/2007 | Koelman et al. |
| 2009/0291626 A1 | 11/2009 | Reder |

FOREIGN PATENT DOCUMENTS

| DE | 3247476 A1 * | 6/1984 | ......... B60H 1/00564 |
| EP | 0193956 * | 9/1986 | |
| EP | 1810892 | 7/2007 | |
| WO | 2016198347 | 12/2016 | |

OTHER PUBLICATIONS

CN206171472, May 2017 Truncated Chinese Document Li et al., May 17, 2017.*

* cited by examiner

*Primary Examiner* — Dennis H Pedder
(74) *Attorney, Agent, or Firm* — Vichit Chea; Price Heneveld LLP

(57) ABSTRACT

A vehicle dashboard includes an air duct proximate an access aperture. The air duct selectively defines sealed and collapsed positions. A display module is positioned proximate the air duct. The display module is selectively accessible via the access aperture when the air duct is in the collapsed position. The collapsed position characterized by a nested portion of the air duct being removed from a duct receptacle.

20 Claims, 8 Drawing Sheets

COLLAPSIBLE PANEL DUCT FOR A VEHICLE HVAC SYSTEM

FIELD OF THE INVENTION

The present invention generally relates to ductwork for a heating ventilation and air conditioning (HVAC) system of a vehicle, and more specifically, a collapsible and removable ductwork section for the HVAC system to allow greater accessibility to interior components of the vehicle.

BACKGROUND OF THE INVENTION

Conventional automobiles include ductwork that extends through various portions of the vehicle, including within a dashboard and behind an instrument panel of the vehicle. Also within the dashboard are numerous components that are positioned alongside the various ductwork of the vehicle HVAC system. Such components can include an automotive heads up display (AHUD), various instrument modules, steering systems, and other similar systems that are at least partially positioned within the dashboard of the vehicle.

SUMMARY OF THE INVENTION

According to one aspect of the present invention, a vehicle dashboard includes an air duct proximate an access aperture. The air duct selectively defines sealed and collapsed positions. A display module is positioned proximate the air duct. The display module is selectively accessible via the access aperture when the air duct is in the collapsed position. The collapsed position is characterized by a nested portion of the air duct being removed from a duct receptacle.

Embodiments of this aspect of the invention can include any one or combination of the following features:
  the display module is inaccessible via the access aperture when the air duct is in the sealed position
  the nested portion of the air duct is received within the duct receptacle in the sealed position, and wherein the nested portion includes at least one laterally slidable member that is operable along a fixed portion of the air duct that defines the duct receptacle
  the nested portion includes first and second nested ducts
  wherein in the sealed position the first nested duct engages a first edge of the duct receptacle and the second nested duct engages a second edge of the duct receptacle
  wherein the sealed position is further characterized by the first and second nested ducts engaging one another between the first and second edges of the duct receptacle
  the first nested duct nests within the second nested duct in at least the sealed position
  the collapsed position is defined by the first nested duct sliding within the second nested duct to define a removal position, and the first and second nested ducts being removed via the access aperture
  the first and second nested ducts are vertically and laterally supported by first and second structural brackets, respectively
  each of the first and second nested ducts includes a bracket recess that slidably receives each of the first and second structural brackets, respectively
  the bracket recesses and the first and second brackets cooperate to define sliding movement of the first and second nested ducts between a removal position and the sealed position and between the removal and collapsed positions
  the access aperture is positioned within a top panel of the vehicle dashboard
  the access aperture defines an access port to an area behind an instrument panel of the vehicle dashboard According to another aspect of the present invention, a method of accessing a display module within an instrument panel includes sliding a nested portion of an air duct from a sealed position to a removal position, removing the nested portion via an access aperture, accessing the display module via the access aperture, placing the nested portion back into the removal position and sliding the nested portion back into the sealed position.

Embodiments of this aspect of the invention can include any one or combination of the following features:
  the nested portion includes a first nested duct and a second nested duct
  wherein the first nested duct is slidable into an interior of the second nested duct
  the nested portion includes a plurality of nested parts that operate to slidably collapse the nested portion into the removal position
  each of the nested parts slides in a nested configuration relative to one another
  wherein the access aperture is positioned within a top panel of a dashboard, wherein the access aperture defines an access port to an area behind the instrument panel According to another aspect of the present invention, a method of accessing an instrument panel display module includes sliding first and second nested ducts to a removal position, removing the first and second nested ducts via an access aperture, accessing the display module via the access aperture, placing the first and second nested ducts proximate a duct receptacle via the access aperture and sliding the first and second nested portions into a sealed position engaged with the duct receptacle.

Embodiments of this aspect of the invention can include any one or combination of the following features:
  the step of removing the first and second nested portions is defined by the first and second nested portions being removed individually, wherein the first nested portion is removed before removing the second nested portion
  the step of removing the first and second nested portions is defined by the first and second nested portions being removed simultaneously, wherein the first nested portion is nested within the second nested portion to define the removal position, and wherein the first and second nested portions are removed as a telescoping duct section
  the first nested portion is nested within second nested portion in at least the sealed position
  the duct receptacle includes a first edge that engages the first nested duct in the sealed position, a second edge that engages the second nested duct in the sealed position and first and second structural brackets that laterally and vertically support the first and second nested ducts at least in the sealed position
  wherein the access aperture is positioned within a top panel of a dashboard, wherein the access aperture defines an access port to an area behind an instrument panel of the dashboard These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
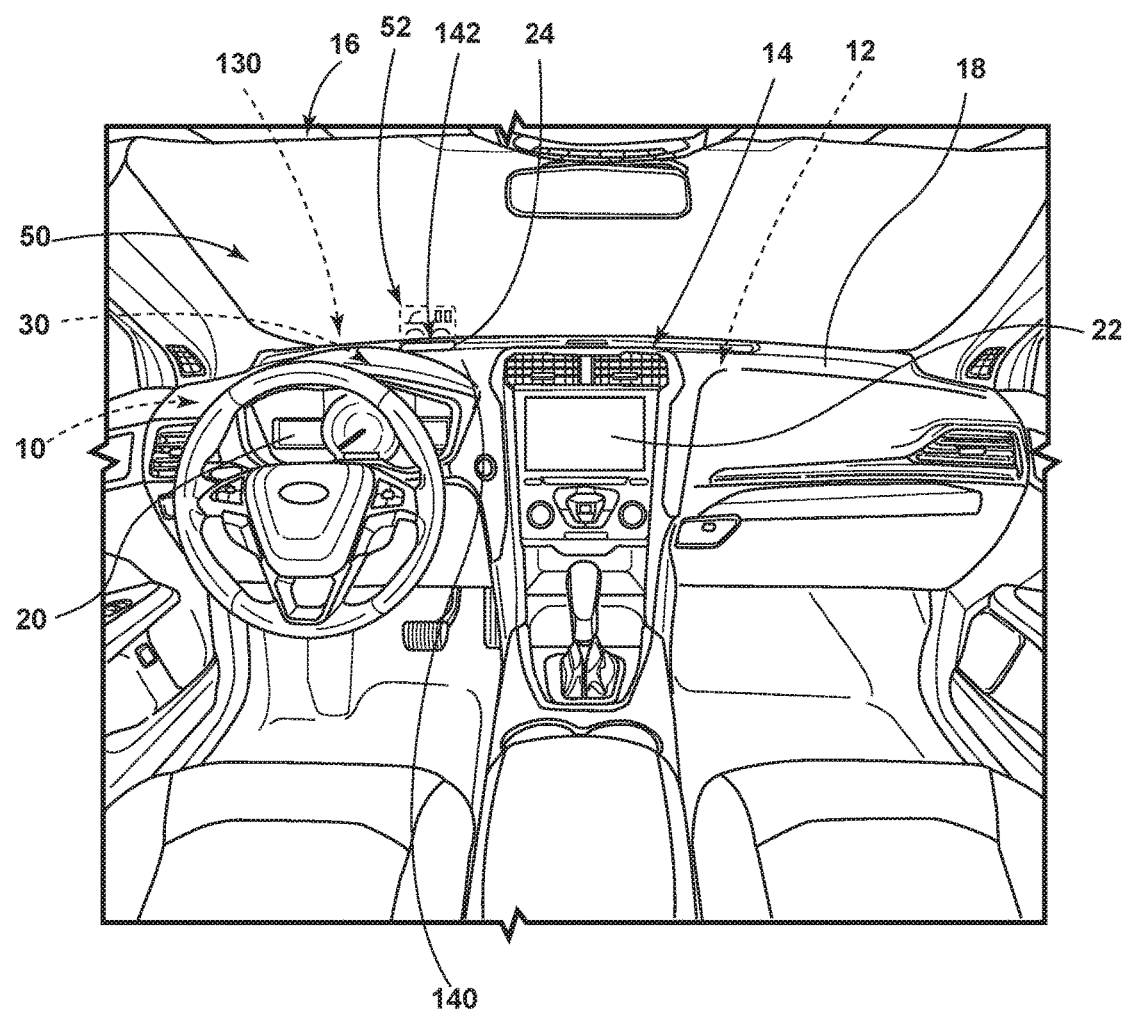
FIG. 1 is a front perspective view of an instrument panel and dashboard positioned within a passenger cabin of a vehicle and incorporating an aspect of the collapsible air duct.
Figure 2:
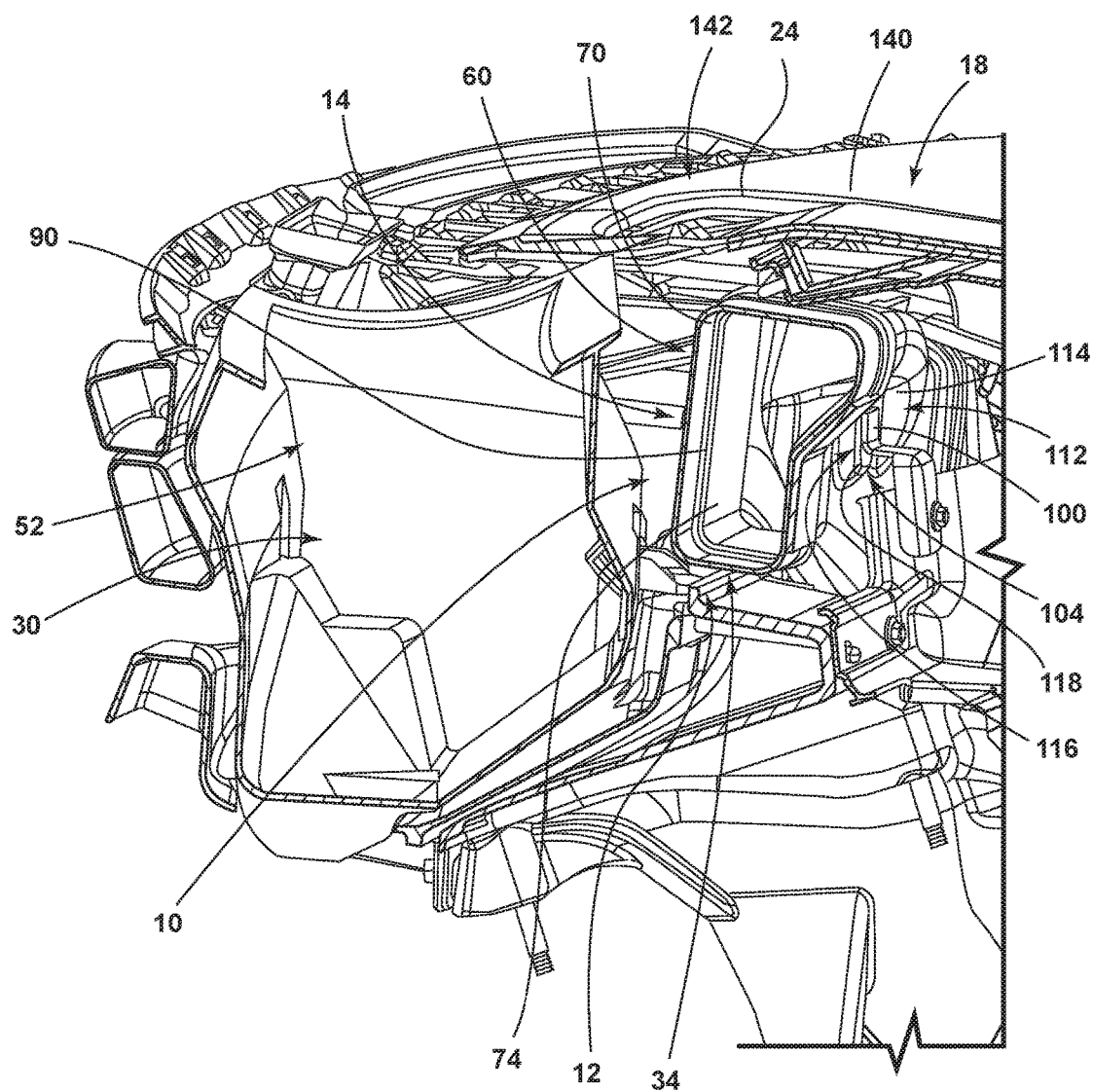
FIG. 2 is a cross-sectional view of a dashboard for a vehicle and illustrating a position of an automotive heads up display in relation to the collapsible air duct and an access aperture.
Figure 3:
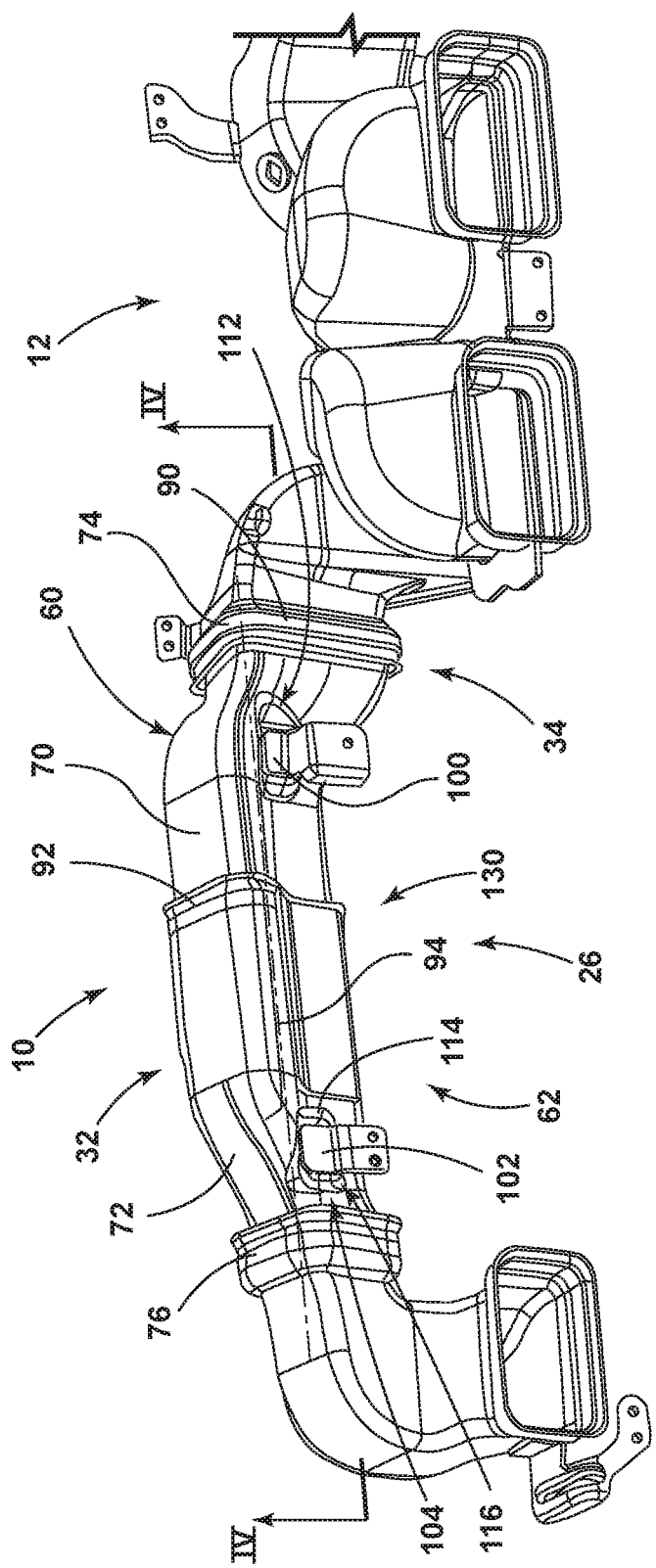
FIG. 3 is a perspective view of a panel duct typically disposed within a dashboard and incorporating an aspect of the collapsible air duct.
Figure 4:
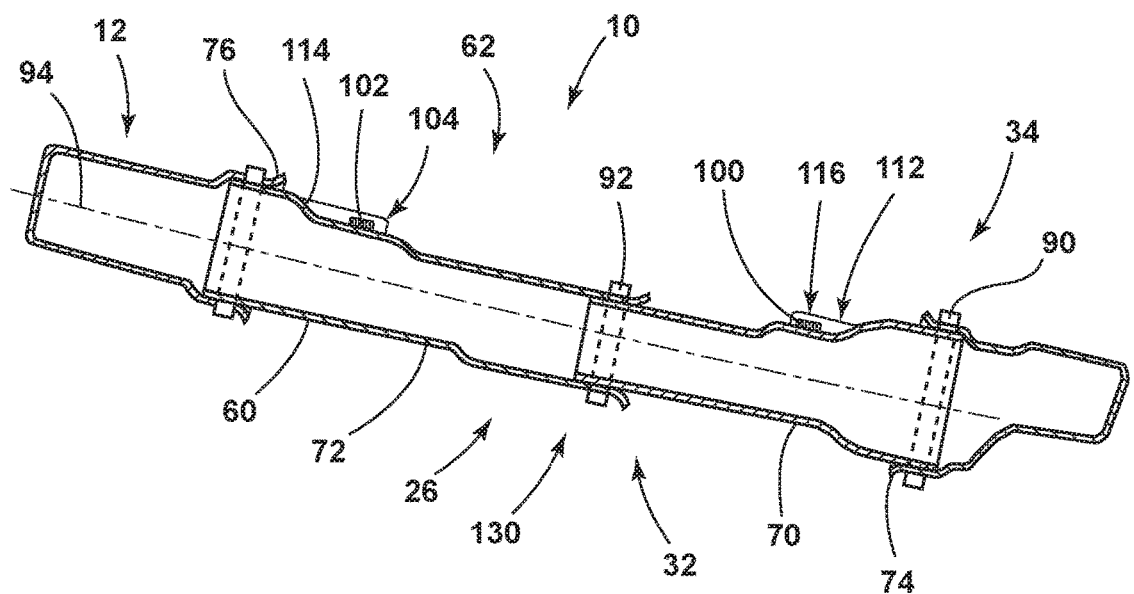
FIG. 4 is a cross-sectional view of the collapsible air duct of FIG. 3 taken along line IV-IV.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-7, 10 and 11, reference numeral 10 generally refers to a collapsible air duct that is incorporated within a portion of a panel duct 12 of a heating ventilation and air conditioning (HVAC) system for a vehicle 16. The panel duct 12 is typically disposed within a dashboard 18 of the vehicle 16 and is typically positioned at least partially behind an instrument display 20 and center console 22 of the vehicle 16. According to various aspects of the device, a dashboard 18 of the vehicle 16 can include an aspect of the collapsible air duct 10 that is disposed proximate an access aperture 24 for the dashboard 18. The collapsible air duct 10 selectively defines sealed and collapsed positions 26, 28 with respect to the remainder of the panel duct 12. A display module 30 is positioned proximate the collapsible air duct 10. The display module 30 is selectively accessible via the access aperture 24 when the collapsible air duct 10 is in the collapsed position 28. According to various aspects of the device, the collapsed position 28 of the collapsible air duct 10 is characterized by a nested portion 32 of the collapsible air duct 10 being removed from a duct receptacle 34 that is at least partially defined by the panel duct 12. Additionally, when the collapsible air duct 10 is in the sealed position 26, the display module 30 is inaccessible via the access aperture 24 or at least substantially inaccessible via the access aperture 24. Accordingly, access to the display module 30 is achievable through removal of the collapsible air duct 10 from the access aperture 24.

In prior art dash assemblies, accessing display mechanisms such as an AHUD or other similar component within the dash assembly and behind the instrument panel requires removal of the instrument panel and portions of the dash and central console. This operation can be very time consuming and costly to the owner of the prior art vehicle. Additionally, certain components that are located within the dash assembly may require regular maintenance such that removal of the dash assembly, instrument panel, central console and other exterior panels is very costly and highly inefficient.

According to various aspects of the device, as exemplified in FIGS. 1-7, 10 and 11, the access aperture 24 allows for removal of the collapsible air duct 10 such that components positioned proximate the access aperture 24 can be accessed for maintenance, replacement, repair and other servicing without the need for removing the dashboard 18, instrument display 20, center console 22, or other larger components of the interior 50 of the vehicle 16. By way of example, and not limitation, a display module 30, such as an AHUD 52 can be positioned near the access aperture 24 for service and repair after the collapsible air duct 10 is removed from the access aperture 24. The use of the collapsible air duct 10 can make these service calls regarding components within the dashboard 18 much faster and far less costly, and generally more efficient. The use of the collapsible air duct 10 can also provide for greater accessibility during manufacture of the vehicle 16 such that installation, positioning or programming of the various display modules 30 can be conducted while the collapsible air duct 10 is removed from the access aperture 24 and after the dashboard 18 and instrument display 20 is in place.

Referring again to FIGS. 1-7, 10 and 11, components positioned near the access aperture 24 typically have greater accessibility when the collapsible air duct 10 is in the collapsed position 28. The collapsed position 28 of the collapsible air duct 10 is characterized by a nested portion 32 of the collapsible air duct 10 being removed from a duct receptacle 34. According to various aspects of the device, the nested portion 32 of the collapsible air duct 10 is received within the duct receptacle 34 in the sealed position 26. The nested portion 32 can include at least one laterally slidable member that is operable along a fixed portion of the panel duct 12 that defines the duct receptacle 34. The nested portion 32 of the collapsible air duct 10 can include a plurality of nestingly slidable duct portions 60 that can be manipulated as a telescoping duct section 62 to collapse and expand within the duct receptacle 34. By collapsing the nested portion 32 of the collapsible air duct 10, the nested portion 32 of the collapsible air duct 10 can be manipulated to be small enough to be easily removed through the access aperture 24. Once the service within the access aperture 24 is complete, the nested portion 32 of the collapsible air duct 10 can be reinserted through the access aperture 24 and the telescoping character of the nested portion 32 can be expanded to engage the duct receptacle 34 in the sealed position 26.

Referring again to FIGS. 1-7, 10 and 11, the nested portion 32 of the collapsible air duct 10 can include first and second nested ducts 70, 72. In the sealed position 26, the first nested duct 70 engages a first edge 74 of the duct receptacle 34 and the second nested duct 72 engages a second edge 76 of the duct receptacle 34. Additionally, the sealed position 26 is further characterized by the first and second nested ducts 70, 72 engaging one another between the first and second edges 74, 76 of the duct receptacle 34. Again, the first and second nested ducts 70, 72 are engaged in a nested configuration such that the first nested duct 70 is positioned at least partially within the second nested duct 72, or vice versa, to allow for the movement of the telescoping duct section 62 defined by the nested portion 32 of the collapsible air duct 10.

Figure 5:
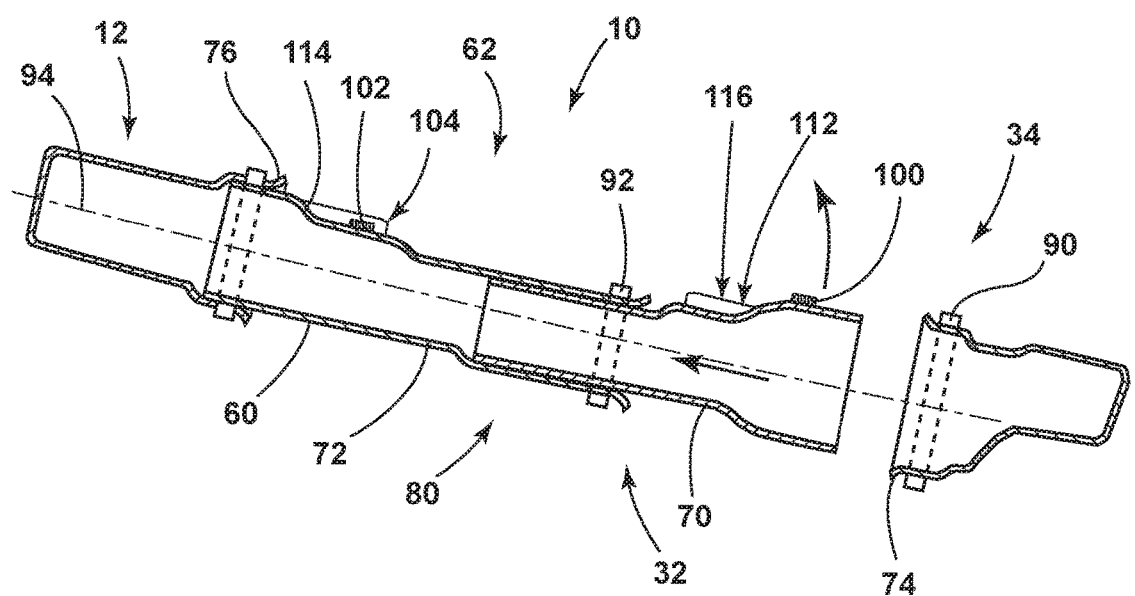
FIG. 5 is a cross-sectional view of the collapsible air duct of FIG. 4 showing a first nested duct moving into a second nested duct for removal via the access aperture.
Figure 6:
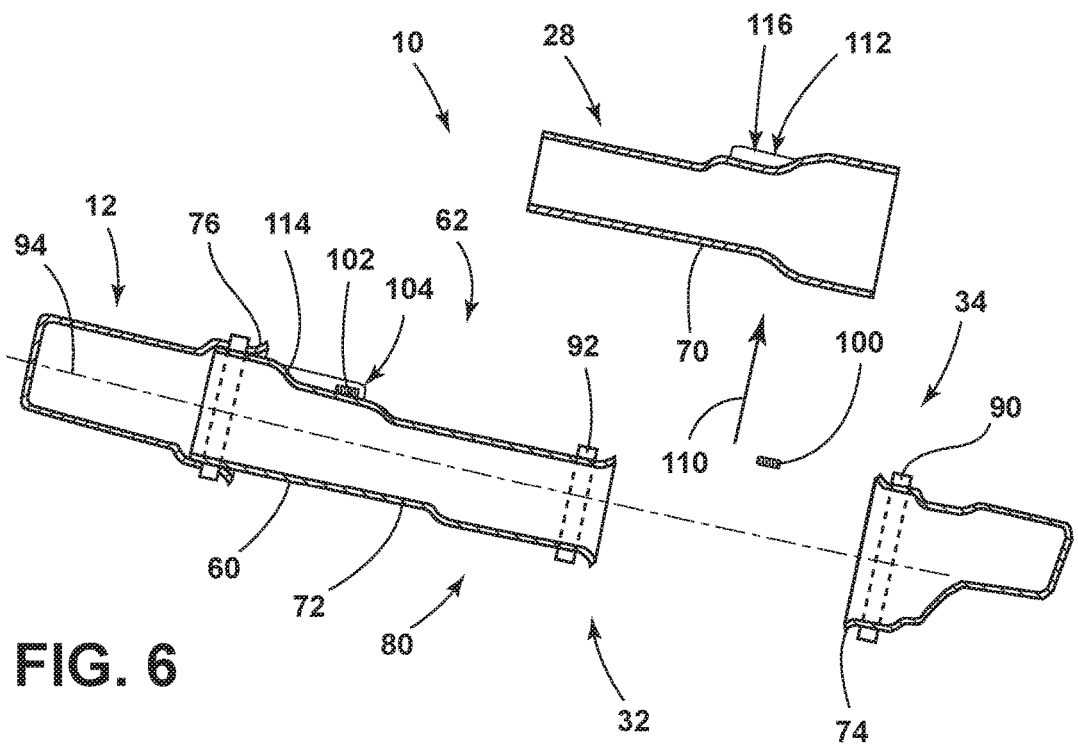
FIG. 6 is a cross-sectional view of the collapsible air duct of FIG. 5 showing the first nested duct removed from the collapsible air duct.
Figure 7:
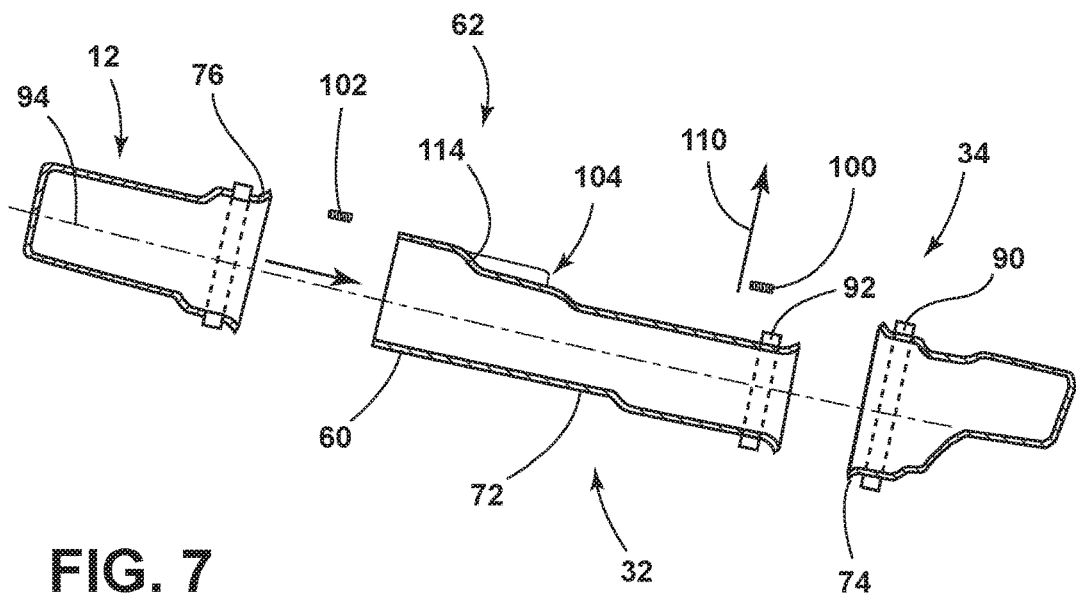
FIG. 7 is a cross-sectional view of the collapsible air duct of FIG. 6 showing the second nested duct being removed from the collapsible air duct.
Figure 8:
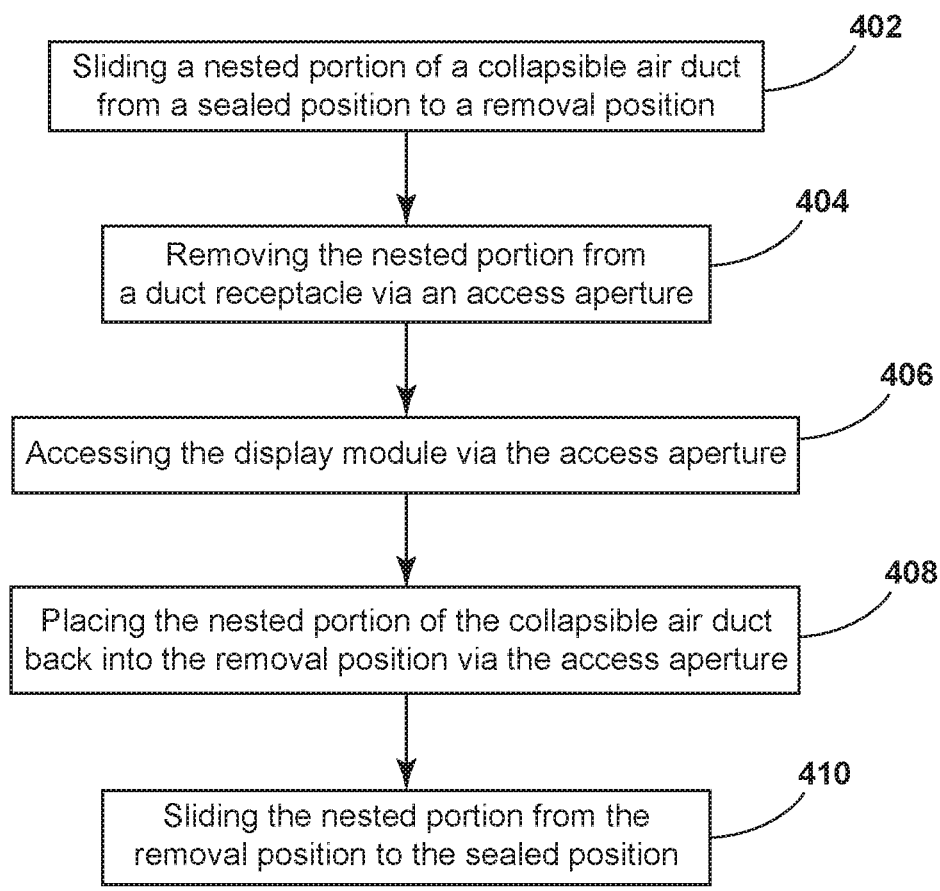
FIG. 8 is a linear flow diagram illustrating a method for accessing a display module within an instrument panel.
Figure 9:
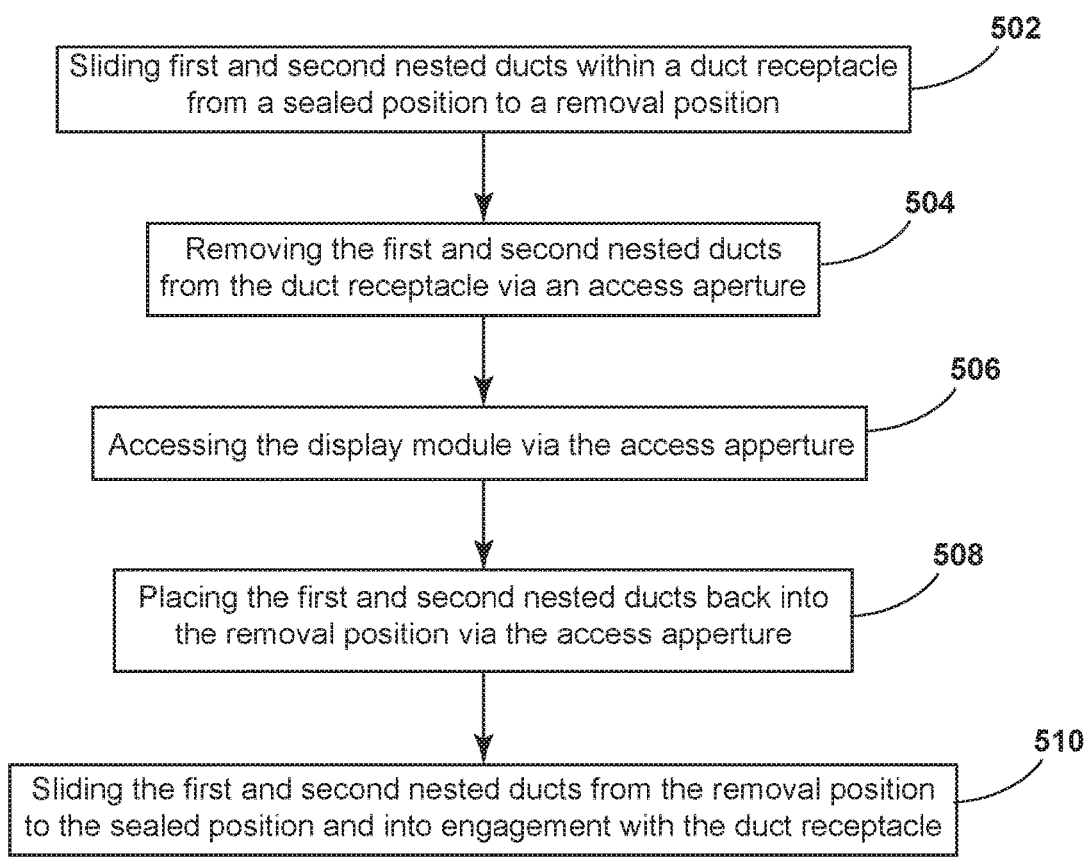
FIG. 9 is a linear flow diagram illustrating a method of accessing an instrument panel display module.
Figure 10:
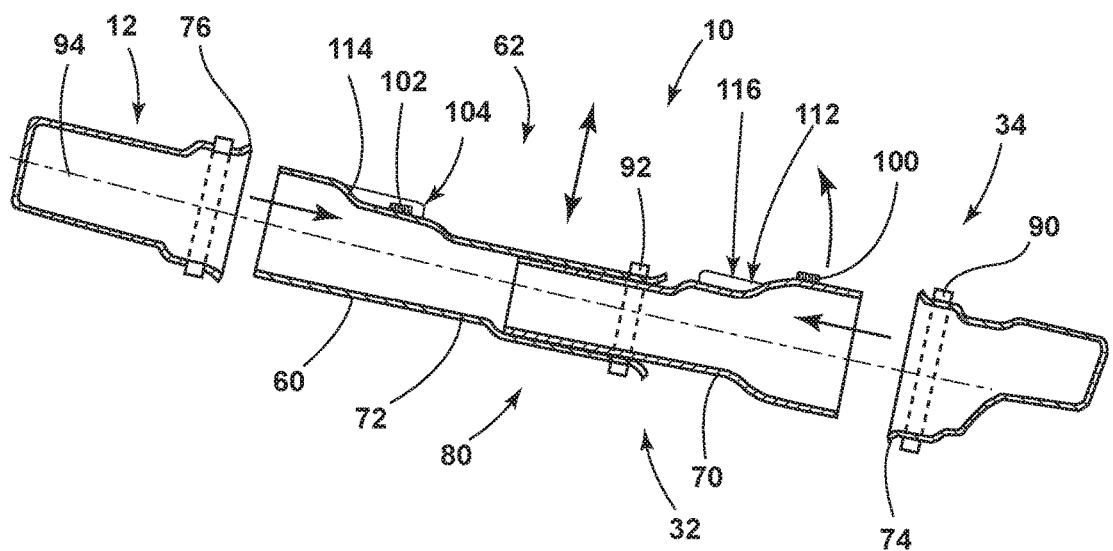
FIG. 10 is a cross-sectional view of the collapsible air duct of FIG. 4 showing first and second nested ducts moving in a telescoping motion for removal via the access aperture.
Figure 11:
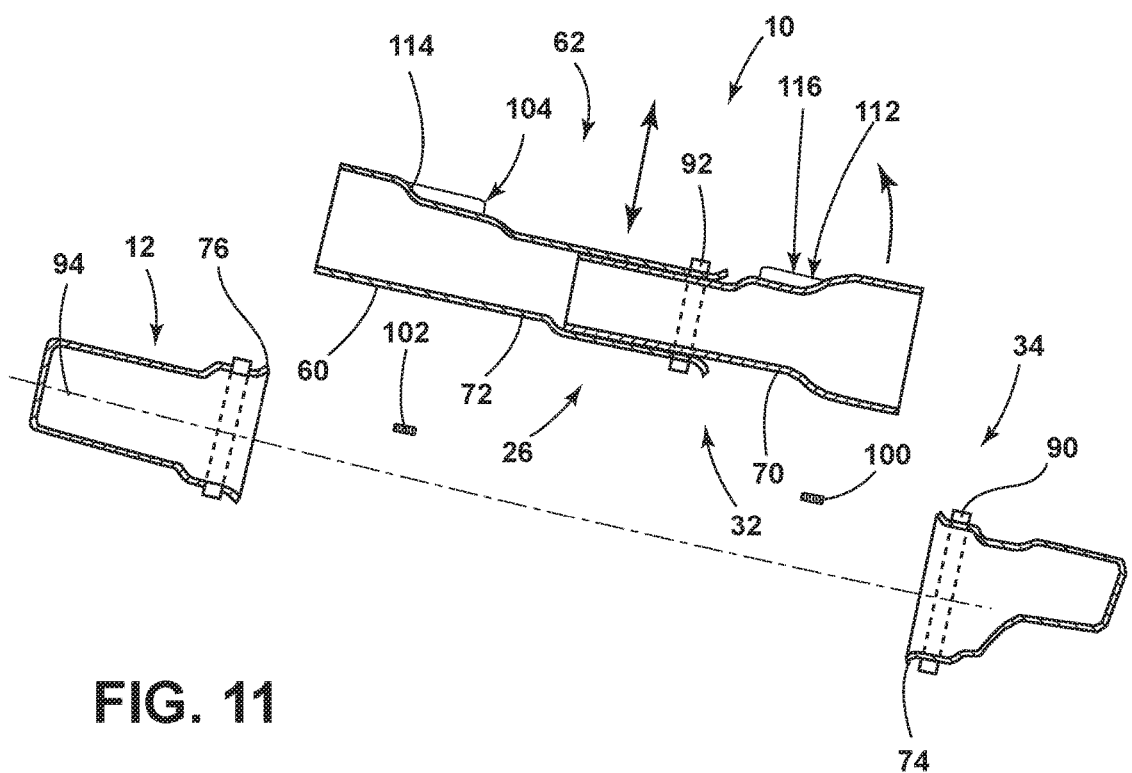
FIG. 11 is a cross-sectional view of the collapsible air duct of FIG. 10 showing the first and second nested ducts removed from the collapsible air duct as a telescoping duct section.

Referring now to FIGS. 4-6 and 10, the collapsed position 28 of the collapsible air duct 10 is achieved, in part, by the first nested duct 70 sliding within the second nested duct 72 to define a removal position 80. Once in the removal position 80, the first and second nested ducts 70, 72 can be removed from the duct receptacle 34 via the access aperture 24 to define the collapsed position 28. According to various aspects of the device, removal of the first and second nested ducts 70, 72 can be accomplished by removal of the first nested duct 70 and then, subsequently, removal of the second nested duct 72, as shown in FIGS. 5 and 6. It is also contemplated that the first nested duct 70 can be slidably inserted within a portion of the second nested duct 72 to define the removal position 80. The first and second nested ducts 70, 72, while in this removal position 80, can be removed simultaneously, as a single unit that is operable as the telescoping duct section 62, via the access aperture 24, as shown in FIG. 10.

Referring again to FIGS. 2-7 and 10, the duct receptacle 34 can include various gaskets 90 or other similar sealing members at each of the first and second edges 74, 76 of the duct receptacle 34. These gaskets 90 are adapted to releasably engage the first and second nested ducts 70, 72 of the collapsible air duct 10 in the sealed position 26. As the first and second nested ducts 70, 72 are moved to the removal position 80, the gaskets 90 act as seals that are adapted to release the first and second nested ducts 70, 72, such that the first and second nested ducts 70, 72 can be slidably operated within the duct receptacle 34 to define the removal position 80. In addition to the gaskets 90 of the first and second edges 74, 76 of the duct receptacle 34, a nesting gasket 92 can also be disposed between the first and second nested ducts 70, 72 such that when the first and second nested ducts 70, 72 are in the sealed position 26, the nesting gasket 92 defines a substantially airtight seal between the first and second nested ducts 70, 72. This nesting gasket 92 also provides for selective lateral movement of the first and second nested ducts 70, 72 in relation to one another and along the longitudinal axis 94 of the duct receptacle 34 to define the sealed position 26, the removal position 80 and the collapsed position 28 of the nested portion 32 of the collapsible air duct 10.

Referring again to FIGS. 2-7 and 10, as the first and second nested ducts 70, 72 occupy the duct receptacle 34, the first and second nested ducts 70, 72 are vertically and laterally supported by first and second structural brackets 100, 102, respectively. The first structural bracket 100 is adapted to engage the first nested duct 70 and allow for slidable operation through the longitudinal axis 94 defined along the duct receptacle 34. To assist in the slidable engagement between the first nested duct 70 and the first structural bracket 100, the first nested duct 70 can include a bracket recess 104 that receives a portion of the first structural bracket 100. The first structural bracket 100 is adapted to prevent downward movement within the duct receptacle 34 and also fore and aft movement within the duct receptacle 34 that is generally perpendicular to the longitudinal axis 94 of the duct receptacle 34. Conversely, the first structural bracket 100 is adapted to allow for lateral movement along the longitudinal axis 94 by slidably engaging the bracket recess 104 of the first nested duct 70. Similarly, the second nested duct 72 also includes a bracket recess 104 that receives the second structural bracket 102. The second structural bracket 102 serves to limit the downward movement of the second nested duct 72 and also fore and aft movement of the second nested duct 72 in a direction perpendicular to the longitudinal axis 94. The configuration of the bracket recess 104 allows for lateral movement of the second nested duct 72 along the longitudinal axis 94 for allowing the second nested duct 72 to slide laterally within the duct receptacle 34 to define the removal position 80.

Additionally, the bracket recesses 104 of the first and second nested ducts 70, 72 are configured to allow for vertical movement 110 of the first and second nested ducts 70, 72 from the removal position 80 and upward and through the access aperture 24. In this manner, each bracket recess 104 can include a boundary wall 112 that extends above each of the first and second brackets, respectively, and to each lateral slide 114 of a sliding space 116 that slidably receives each of the first and second structural brackets 100, 102, respectively. A lower edge 118 of the bracket recess 104 may have a minimal boundary or no boundaries. In this manner, once the first and second nested ducts 70, 72 are in the removal position 80, the lower edge 118 of each of the bracket recesses 104 allows for convenient upward movement of the first and second nested ducts 70, 72 away from the structural brackets and away from the duct receptacle 34 and through the access aperture 24. This lower edge 118 of each duct recess also allows for easy downward reinsertion of the first and second nested ducts 70, 72 into the duct receptacle 34 via the access aperture 24.

Referring again to FIGS. 2-7 and 10, during insertion of the first and second nested ducts 70, 72 through the access aperture 24 and into the removal position 80, the engagement of the first and second structural brackets 100, 102 with the respective duct receptacles 34 can provide for positive feedback to instruct the user that the removal position 80 and/or the sealed position 26 has been achieved. This positive feedback can be in the form of slidable insertion of the first and second nested ducts 70, 72 into the duct receptacle 34 and into engagement with the first and second structural brackets 100, 102, as well as visual, auditory and/or tactile feedback. The use of the first and second structural brackets 100, 102 can serve to align the first and second nested ducts 70, 72 in the removal and sealed positions 80, 26. In this manner, the telescoping lateral extension and retraction of the first and second nested ducts 70, 72 can be accomplished to define and/or redefine the sealed position 26 of the collapsible air duct 10. Accordingly, the bracket recesses 104 and the first and second structural brackets 100, 102 cooperate to define sliding movement of the first and second nested ducts 70, 72 between the removal position 80 and the collapsed position 28 to remove the collapsible air duct 10 from the access aperture 24, and also between the removal position 80 and the sealed position 26 to place the collapsible air duct 10 back into a functional state 130 within the duct aperture for operation of the HVAC system 14 of a vehicle 16.

According to various aspects of the device, the access aperture 24 can be disposed and positioned within a top panel 140 of the dashboard 18. The access aperture 24 serves to define an access port 142 within an area behind the instrument display 20 of the dashboard 18 to allow for convenient access to these portions of the vehicle 16 without the need for removing the dashboard 18, instrument display 20, center console 22, or other portions of the vehicle 16.

Referring now to FIGS. 1-8, 10 and 11, having discussed various aspects of the collapsible air duct 10, a method 400 is disclosed for accessing a display module 30 within an instrument panel by removing the collapsible air duct 10 via the access aperture 24. According to the method 400, step 402 includes sliding a nested portion 32 of the collapsible air duct 10 from the sealed position 26 to a removal position 80. Once in the removal position 80, the nested portion 32 can be removed via the access aperture 24 defined within a portion of the dashboard 18 and/or instrument panel (step 404). After the nesting portion is removed, the display module 30 can be accessed via the access aperture 24 (step 406). After access to the display module 30 is no longer needed, such as after a service, replacement or repair is complete, the nested portion 32 of the collapsible air duct 10 can be placed back into the removal position 80 via the access aperture 24 (step 408). The nested portion 32 of the collapsible air duct 10 can then be slidably operated from the removal position 80 back into the sealed position 26 (step 410). As discussed above, the nested portion 32 of the collapsible air duct 10 can include the first and second nested ducts 70, 72 that can be removed from the access aperture 24 either sequentially or simultaneously. As discussed previously, it is contemplated that the nested portion 32 can include a plurality of nested parts that operate to slidably collapse the nested portion 32 into the removal position 80. In such an embodiment, each of the nested parts is adapted to slide in a nesting configuration relative to one another that is characterized by a telescoping operation.

Referring now to FIGS. 1-7 and 9-11, a method 500 is disclosed for accessing an instrument panel display module 30 by first removing a portion of the collapsible air duct 10 via the access aperture 24. According to the method 500, step 502 includes sliding first and second nested ducts 70, 72 that are disposed within a duct receptacle 34 from a sealed position 26 to a removal position 80. Once in the removal position 80, the first and second nested ducts 70, 72 can be removed via the access aperture 24 (step 504). Once the first and second nested ducts 70, 72 are removed, the display module 30 can be accessed via the access aperture 24 (step 506). After service of the display module 30 is complete, the first and second nested ducts 70, 72 can be placed in a position proximate the duct receptacle 34 via the access aperture 24 (step 508). Once within the area of the duct receptacle 34, the first and second nested portions 32 can be slidably operated from the removal position 80 back into the sealed position 26 and into engagement with the duct receptacle 34 (step 510).

According to various aspects of the device, it is contemplated that the telescoping duct sections 62 of the nested portion 32 can be implemented within various portions of the HVAC system 14 of the vehicle 16 within the panel duct 12 and also within other air ducts of the HVAC system 14. Such air ducts can be located within the dashboard 18, the headliner of the vehicle 16, the floor of the vehicle 16, within a center console 22 of the vehicle 16, through the doors of the vehicle 16, in the roof of a vehicle 16, combinations thereof, and other similar locations within a vehicle 16. The use of the collapsible air duct 10 can serve to provide access to various portions of the vehicle 16 where space may be limited for providing access to various components. By using the collapsible air duct 10, greater access can be provided that can limit the cost of repairs, the time of repairs and can increase general efficiency of manufacture and servicing of the vehicle 16.

According to various aspects of the device, the various gaskets 90 and nesting gaskets 92 that are located within the duct receptacle 34 and between the various nested portions 32 of the collapsible air duct 10 can include loosening and tightening features that can be operated to provide greater sealing strength when in the sealed position 26. During servicing, these tightening mechanisms can be loosened such that movement of the first and second nested ducts 70, 72 from the sealed position 26 to the removal position 80 can be accomplished in a convenient manner.

According to various aspects of the device, the collapsible air duct 10 can be used within various vehicles 16 that can include, but are not limited to, SUVs, trucks, sedans, coupes, mass transit vehicles, combinations thereof and other similar vehicles 16.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A vehicle dashboard comprising:
an air duct proximate an access aperture, the air duct selectively defining sealed and collapsed positions; and
a display module positioned proximate the air duct, the display module being selectively accessible via the access aperture when the air duct is in the collapsed position, the collapsed position characterized by a nested portion of the air duct being removed from a duct receptacle.

2. The vehicle dashboard of claim 1, wherein the display module is inaccessible via the access aperture when the air duct is in the sealed position.

3. The vehicle dashboard of claim 1, wherein the nested portion of the air duct is received within the duct receptacle in the sealed position, and wherein the nested portion includes at least one laterally slidable member that is operable along a fixed portion of the air duct that defines the duct receptacle.

4. The vehicle dashboard of claim 1, wherein the nested portion includes first and second nested ducts, wherein in the sealed position the first nested duct engages a first edge of the duct receptacle and the second nested duct engages a second edge of the duct receptacle, and wherein the sealed position is further characterized by the first and second nested ducts engaging one another between the first and second edges of the duct receptacle.

5. The vehicle dashboard of claim 4, wherein the first nested duct nests within the second nested duct in at least the sealed position.

6. The vehicle dashboard of claim 4, wherein the collapsed position is defined by the first nested duct sliding within the second nested duct to define a removal position, and the first and second nested ducts being removed via the access aperture.

7. The vehicle dashboard of claim 4, wherein the first and second nested ducts are vertically and laterally supported by first and second structural brackets, respectively.

8. The vehicle dashboard of claim 7, wherein each of the first and second nested ducts includes a bracket recess that slidably receives each of the first and second structural brackets, respectively.

9. The vehicle dashboard of claim 8, wherein the bracket recesses and the first and second brackets cooperate to define sliding movement of the first and second nested ducts between a removal position and the sealed position and between the removal and collapsed positions.

10. The vehicle dashboard of claim 1, wherein the access aperture is positioned within a top panel of the vehicle dashboard, wherein the access aperture defines an access port to an area behind an instrument panel of the vehicle dashboard.

11. A method of accessing a display module within an instrument panel, the method comprising steps of:
sliding a nested portion of an air duct from a sealed position to a removal position;
removing the nested portion via an access aperture;
accessing the display module via the access aperture;
placing the nested portion back into the removal position; and
sliding the nested portion back into the sealed position.

12. The method of claim 11, wherein the nested portion includes a first nested duct and a second nested duct, wherein the first nested duct is slidable into an interior of the second nested duct.

13. The method of claim 11, wherein the nested portion includes a plurality of nested parts that operate to slidably collapse the nested portion into the removal position, wherein each of the nested parts slides in a nested configuration relative to one another.

14. The method of claim 11, wherein the access aperture is positioned within a top panel of a dashboard, wherein the access aperture defines an access port to an area behind the instrument panel.

15. A method of accessing an instrument panel display module comprising steps of:
sliding first and second nested ducts to a removal position;
removing the first and second nested ducts via an access aperture;
accessing the display module via the access aperture;
placing the first and second nested ducts proximate a duct receptacle via the access aperture; and
sliding the first and second nested portions into a sealed position engaged with the duct receptacle.

16. The method of claim 15, wherein the step of removing the first and second nested portions is defined by the first and second nested portions being removed individually, wherein the first nested portion is removed before removing the second nested portion.

17. The method of claim 15, wherein the step of removing the first and second nested portions is defined by the first and second nested portions being removed simultaneously, wherein the first nested portion is nested within the second nested portion to define the removal position, and wherein the first and second nested portions are removed as a telescoping duct section.

18. The method of claim 15, wherein the first nested portion is nested within second nested portion in at least the sealed position.

19. The method of claim 15, wherein the duct receptacle includes a first edge that engages the first nested duct in the sealed position, a second edge that engages the second nested duct in the sealed position and first and second structural brackets that laterally and vertically support the first and second nested ducts at least in the sealed position.

20. The method of claim 15, wherein the access aperture is positioned within a top panel of a dashboard, wherein the access aperture defines an access port to an area behind an instrument panel of the dashboard.

* * * * *

UNITED STATES PATENT AND TRADEMARK OFFICE
CERTIFICATE OF CORRECTION

PATENT NO.         : 10,076,958 B1
APPLICATION NO.    : 15/635404
DATED              : September 18, 2018
INVENTOR(S)        : Stacey H. Raines et al.

It is certified that error appears in the above-identified patent and that said Letters Patent is hereby corrected as shown below:

<u>Column 10</u>
Claim 18, Line 28, after "within" insert --the--.

Signed and Sealed this
Eleventh Day of December, 2018

Andrei Iancu
*Director of the United States Patent and Trademark Office*